(12) United States Patent  
O'Connor et al.

(10) Patent No.: US 12,561,699 B2  
(45) Date of Patent: Feb. 24, 2026

(54) SUSTAINABLE ENTERPRISE ENERGY BALANCING

(71) Applicant: Dell Products L.P., Round Rock, TX (US)

(72) Inventors: Aaron O'Connor, Dublin (IE); Claire Micallef, Bray (IE)

(73) Assignee: DELL PRODUCTS L.P., Round Rock, TX (US)

(*) Notice: Subject to any disclaimer, the term of this patent is extended or adjusted under 35 U.S.C. 154(b) by 86 days.

(21) Appl. No.: 18/420,026

(22) Filed: Jan. 23, 2024

(65) Prior Publication Data

US 2025/0238806 A1 Jul. 24, 2025

(51) Int. Cl.  
*G06Q 30/018* (2023.01)

(52) U.S. Cl.  
CPC .................................. *G06Q 30/018* (2013.01)

(58) Field of Classification Search  
None  
See application file for complete search history.

(56) References Cited

U.S. PATENT DOCUMENTS

| | | | |
|---|---|---|---|
| 11,461,378 B1 * | 10/2022 | Bhushan | G06F 16/248 |
| 2012/0259583 A1 * | 10/2012 | Noboa | H02J 13/00002 |
| | | | 702/179 |
| 2014/0281645 A1 * | 9/2014 | Sen | H02J 3/003 |
| | | | 713/340 |
| 2015/0244850 A1 * | 8/2015 | Rodriguez | G06F 18/24 |
| | | | 455/556.1 |
| 2019/0333512 A1 * | 10/2019 | Canim | G10L 15/22 |
| 2019/0349190 A1 * | 11/2019 | Smith | H04W 84/22 |
| 2023/0327458 A1 * | 10/2023 | Cella | G05B 19/042 |
| | | | 700/286 |

OTHER PUBLICATIONS

"Runbook execution in Azure Automation", Microsoft, https://web.archive.org/web/20230120150443/https://learn.microsoft.com/en-us/azure/automation/automation-runbook-execution, Dec. 29, 2022, captured Jan. 20, 2023 (Year: 2022).*  
EirGrid "EirGrid: Smart Grid Dashboard" EirGrid, https://www.smartgriddashboard.com/#all, Last Accessed Jan. 23, 2024, 3 pages.

(Continued)

*Primary Examiner* — George Chen  
(74) *Attorney, Agent, or Firm* — Amin, Turocy & Watson, LLP

(57) ABSTRACT

Sustainable enterprise-wide energy balancing is presented herein, which describes a series of processes to make choices in favor of a sustainably sourced energy mix, grid reliability, and/or to prioritize critical systems in times of a catastrophe. An example method comprises receiving a group of input data representing a standardized phrase, wherein the group of input data is received from first equipment associated with an electric power generation and transmission operator entity; parsing the standardized phrase to identify an initiating event; in response to identifying the initiating event, determining that an initiating threshold value associated with the initiating event has fallen below a defined risk threshold value; and executing, on remote second equipment, a flow of customer defined processes representing a group of runbooks.

20 Claims, 10 Drawing Sheets

500

IN RESPONSE TO RECEIVING A GROUP OF INPUT DATA FROM AN ELECTRIC POWER GENERATION AND TRANSMISSION OPERATOR, LEXICALLY PARSE A STANDARDIZED PHRASE INCLUDED IN THE GROUP OF INPUT DATA — 502

BASED ON THE STANDARDIZED PHRASE, DETERMINE AN OCCURRENCE OF A TRIGGER EVENT — 504

IN RESPONSE TO THE TRIGGER EVENT, DETERMINE THAT A RISK THRESHOLD VALUE HAS BEEN EXCEEDED AND PROCESS A FLOW OF PROCESSES REPRESENTING A CUSTOMIZED COLLECTION OF RUNBOOKS — 506

BASED ON THE FLOW OF PROCESSES, CAUSE EQUIPMENT ASSOCIATED WITH A CUSTOMER AFFILIATED WITH THE COLLECTION OF RUNBOOKS TO POWER DOWN — 508

ADJUST A PROBABILITY WEIGHTING VALUE ASSOCIATED WITH EACH PROCESS OF THE FLOW OF PROCESSES — 510

(56) References Cited

OTHER PUBLICATIONS

Gridwatch.co.uk "GB Fuel type power generation production" GridWatch.co.uk, https://gridwatch.co.uk/, Last Accessed Jan. 23, 2024, 4 pages.

RTE "eCO2mix—Power generation by energy source" Rte, https://www.rte-france.com/en/eco2mix/power-generation-energy-source, Last Accessed Jan. 23, 2024, 3 pages.

U.S. Energy Information Administration "Hourly Electric Grid Monitor" U.S. Energy Information Administration, https://www.eia.gov/electricity/gridmonitor/dashboard/daily_generation_mix/US48/US48, Last Accessed Jan. 23, 2024, 15 pages.

National Power Portal "National Power Portal" National Power Portal, https://npp.gov.in/dashBoard/gc-map-dashboard, Last Accessed Jan. 23, 2024, 8 pages.

* cited by examiner

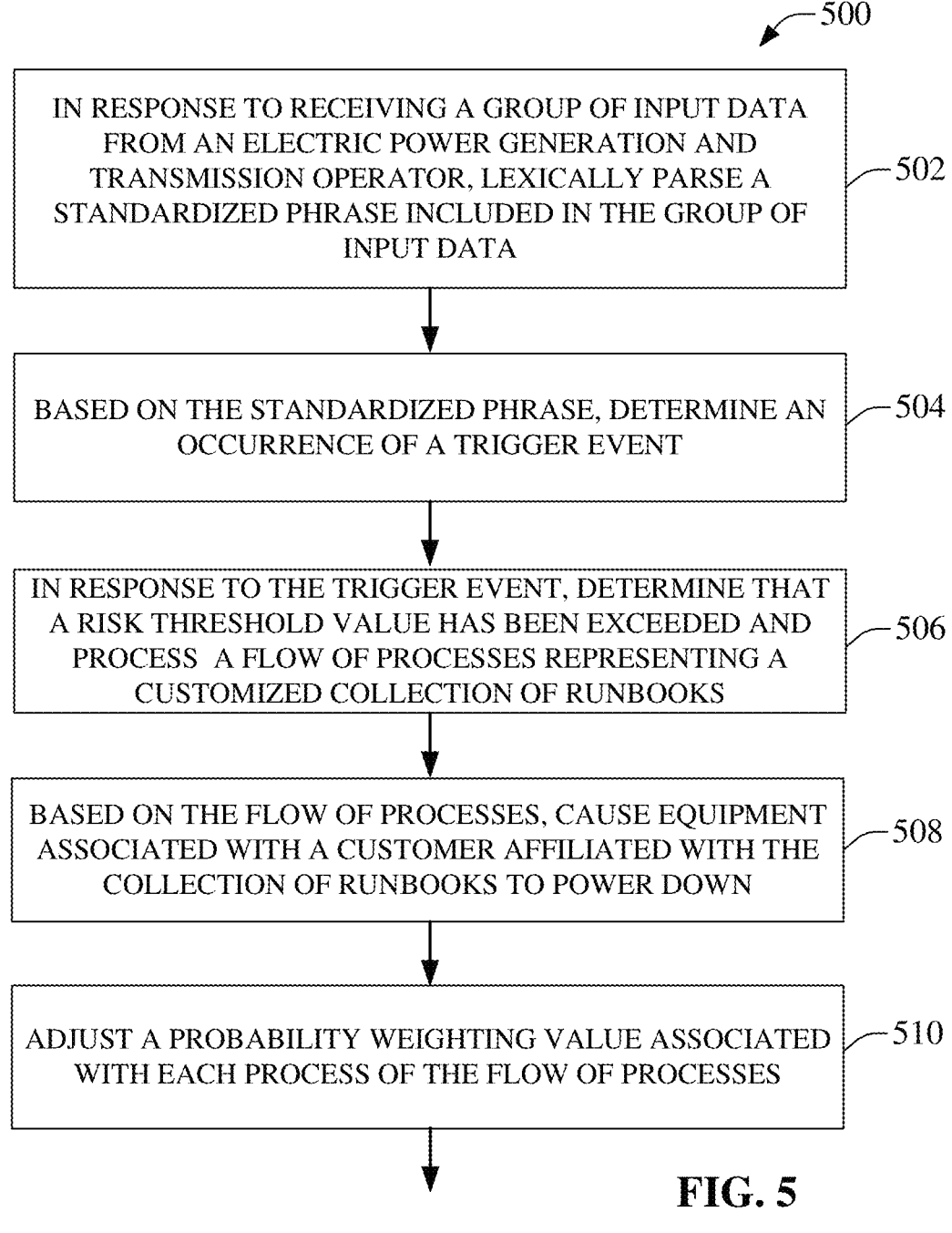

500

IN RESPONSE TO RECEIVING A GROUP OF INPUT DATA FROM AN ELECTRIC POWER GENERATION AND TRANSMISSION OPERATOR, LEXICALLY PARSE A STANDARDIZED PHRASE INCLUDED IN THE GROUP OF INPUT DATA ⟋502

BASED ON THE STANDARDIZED PHRASE, DETERMINE AN OCCURRENCE OF A TRIGGER EVENT ⟋504

IN RESPONSE TO THE TRIGGER EVENT, DETERMINE THAT A RISK THRESHOLD VALUE HAS BEEN EXCEEDED AND PROCESS A FLOW OF PROCESSES REPRESENTING A CUSTOMIZED COLLECTION OF RUNBOOKS ⟋506

BASED ON THE FLOW OF PROCESSES, CAUSE EQUIPMENT ASSOCIATED WITH A CUSTOMER AFFILIATED WITH THE COLLECTION OF RUNBOOKS TO POWER DOWN ⟋508

ADJUST A PROBABILITY WEIGHTING VALUE ASSOCIATED WITH EACH PROCESS OF THE FLOW OF PROCESSES ⟋510

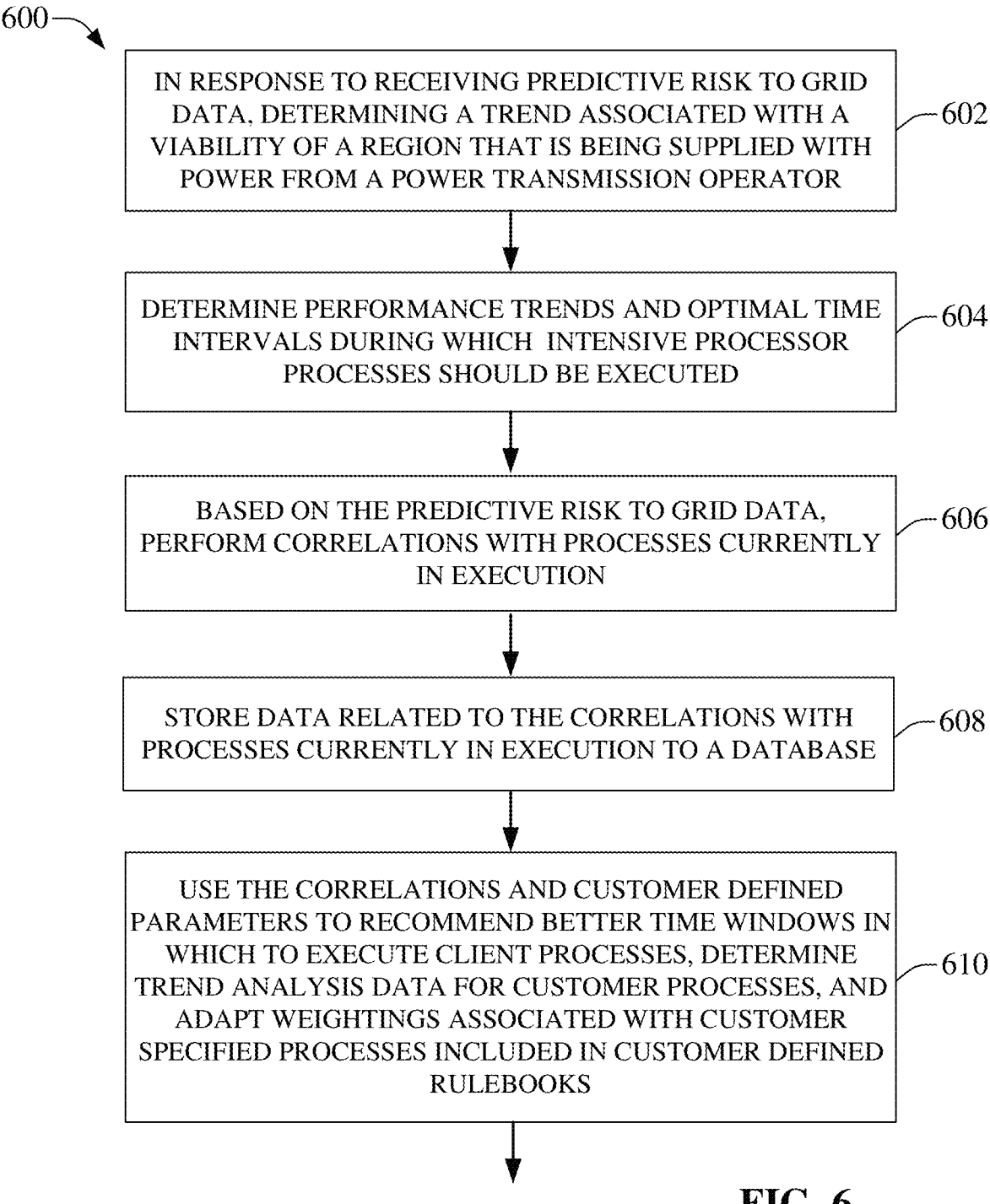

IN RESPONSE TO RECEIVING PREDICTIVE RISK TO GRID DATA, DETERMINING A TREND ASSOCIATED WITH A VIABILITY OF A REGION THAT IS BEING SUPPLIED WITH POWER FROM A POWER TRANSMISSION OPERATOR — 602

DETERMINE PERFORMANCE TRENDS AND OPTIMAL TIME INTERVALS DURING WHICH INTENSIVE PROCESSOR PROCESSES SHOULD BE EXECUTED — 604

BASED ON THE PREDICTIVE RISK TO GRID DATA, PERFORM CORRELATIONS WITH PROCESSES CURRENTLY IN EXECUTION — 606

STORE DATA RELATED TO THE CORRELATIONS WITH PROCESSES CURRENTLY IN EXECUTION TO A DATABASE — 608

USE THE CORRELATIONS AND CUSTOMER DEFINED PARAMETERS TO RECOMMEND BETTER TIME WINDOWS IN WHICH TO EXECUTE CLIENT PROCESSES, DETERMINE TREND ANALYSIS DATA FOR CUSTOMER PROCESSES, AND ADAPT WEIGHTINGS ASSOCIATED WITH CUSTOMER SPECIFIED PROCESSES INCLUDED IN CUSTOMER DEFINED RULEBOOKS — 610

FIG. 6

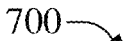

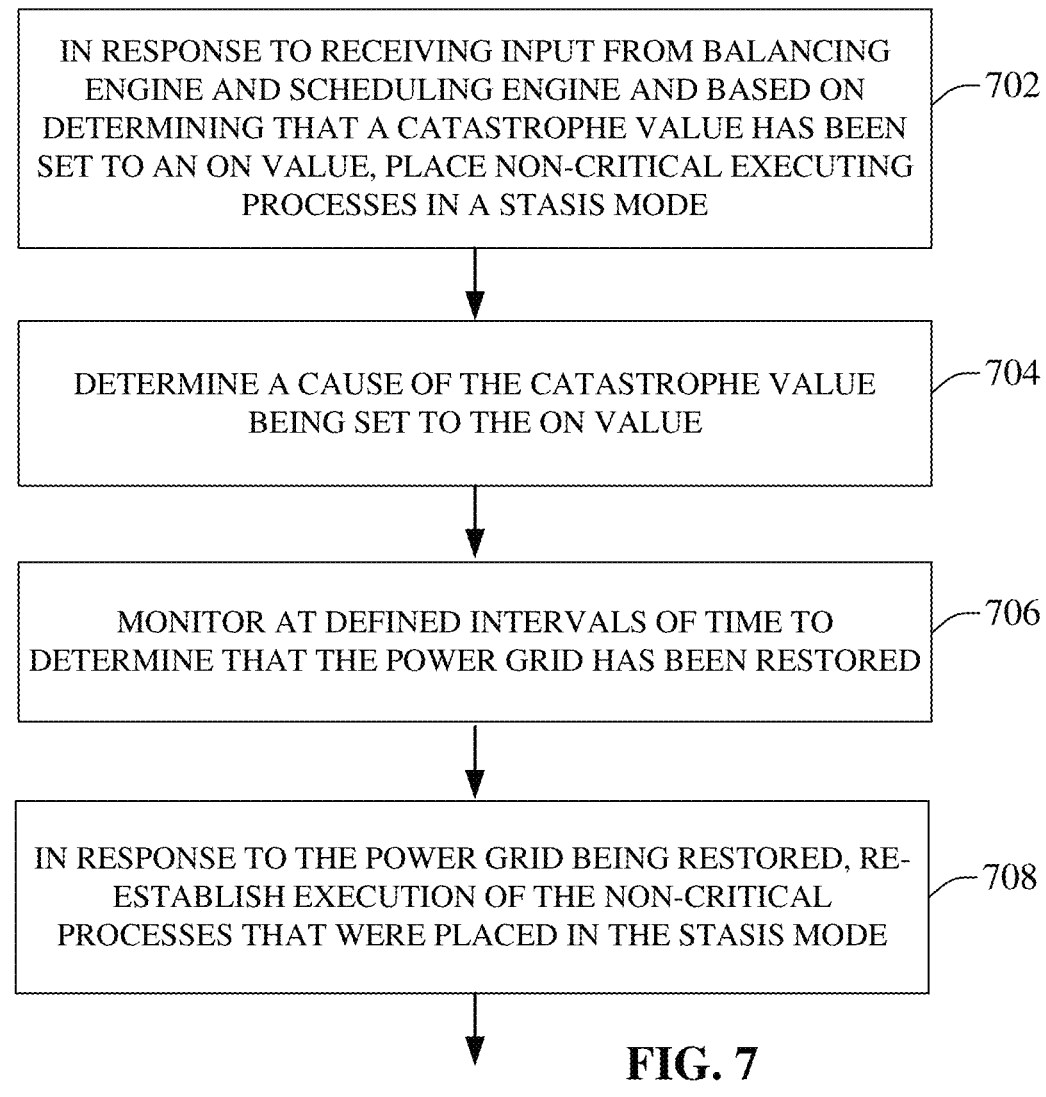

700

IN RESPONSE TO RECEIVING INPUT FROM BALANCING ENGINE AND SCHEDULING ENGINE AND BASED ON DETERMINING THAT A CATASTROPHE VALUE HAS BEEN SET TO AN ON VALUE, PLACE NON-CRITICAL EXECUTING PROCESSES IN A STASIS MODE — 702

DETERMINE A CAUSE OF THE CATASTROPHE VALUE BEING SET TO THE ON VALUE — 704

MONITOR AT DEFINED INTERVALS OF TIME TO DETERMINE THAT THE POWER GRID HAS BEEN RESTORED — 706

IN RESPONSE TO THE POWER GRID BEING RESTORED, RE-ESTABLISH EXECUTION OF THE NON-CRITICAL PROCESSES THAT WERE PLACED IN THE STASIS MODE — 708

FIG. 7

SUSTAINABLE ENTERPRISE ENERGY BALANCING

BACKGROUND

Enterprise information technology providers, for example, data storage services operators, high performance compute operators, and/or cloud management service platform operators and their clients and customers are under increasing pressure to lower their respective carbon footprints, but do not have sufficient knowledge, visibility, access, and/or control over their infrastructure's energy consumption. This increasing pressure is coming from multiple sources, such as the European Union (EU) corporate sustainability reporting directive (CSRD). Likewise, local energy/power grids can have imposed on them governmentally mandated requirements and/or regulatory responsibilities during times of high demand and insufficient supply, for energy users to reduce demand immediately, or risk brownout/blackout scenarios. Such events can have dangerous consequences on critical infrastructure. Furthermore, renewable energy outputs in some scenarios may not perform sufficiently during spikes in demand, thus traditional alternative sources (e.g., gas, coal, nuclear, etc.) can be required to meet the unmet demand.

Additionally, there is a latent desire by information technology (IT) customers to lower their carbon footprints and energy costs, but typically these entities do not have the needed knowledge, access, visibility, and control over their information technology hardware energy consumption.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 5 illustrates yet a further flow chart or a method for achieving sustainable enterprise wide energy balancing, in accordance with various non-limiting example embodiments.

FIG. 6 depicts a further flow chart or a method for achieving sustainable enterprise wide energy balancing, in accordance with various non-limiting example embodiments.

FIG. 7 depicts a further flow chart or a method for achieving sustainable enterprise wide energy balancing, in accordance with various non-limiting example embodiments.

DETAILED DESCRIPTION

Figure 1:
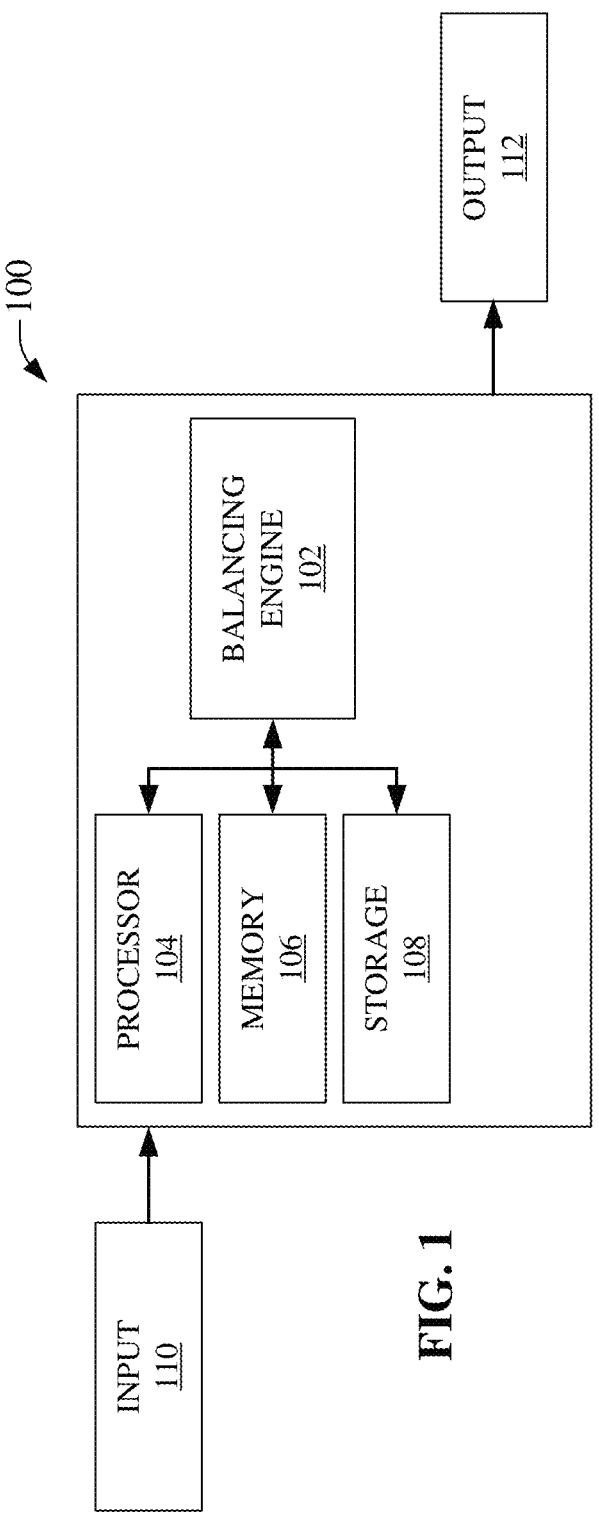
FIG. 1 illustrates a block diagram of a system for achieving sustainable enterprise wide energy balancing, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

A sustainable enterprise energy balancing solution (SEEBS) is presented herein, which describes a series of processes to make choices in favor of a sustainably sourced energy mix, grid reliability, and/or to prioritize critical systems in times of a catastrophe. Thus, the subject disclosure generally relates to embodiments for achieving sustainable enterprise wide energy balancing. In order to empower information technology customers to reduce energy consumption a reactive and/or proactive energy balancing engine is disclosed and described. In general, the disclosed balancing engine can use data inputs from electricity grids (e.g., interconnected networks for transmission and delivery of electricity from producers to consumers). Further, data inputs can also be acquired from one or more energy aggregator services that aggregate data from a multiplicity of energy grids operated by disparate electric power generation and transmission operators. The disclosed energy balancing engine can allow energy consumers to opt-in to select and/or identify consumption levels for individual elements (e.g., devices, groups of devices, apparatuses, machines, and the like) of an information technology hardware infrastructure, in response to general power challenges, as well as sustainable normal power options. Additionally, operating systems and/or applications in execution on each of the individual elements can also have facilities and functionalities, through machine-learning, data mining, and probabilistic determinations to identify consumption levels in response to power challenges and sustainable normal power options. Further, the described energy balancing engine can also provide facilities to allow energy consumers to selectively opt-out of the consumption levels for identified elements.

In accordance with various described embodiments, reduction of information technology energy consumption can be promoted by empowering customers of data storage services operators, cloud managed service platform operators, and the like, to reduce their information technology energy consumption through use of 'as a service' models and/or 'as a service' instances (e.g., software in execution). The systems and methods disclosed herein can establish a plethora of 'as a service' instances, such as reactive and proactive power balancing engine instances (e.g., power balancing engine instances). Using input from the customer's local grid in conjunction with a power balancing engine instance hosted, for example, on centralized and/or distributed equipment located in a cloud infrastructure (e.g., groups of equipment comprising processors and memories) that are interconnected and/or situated locally and/or remotely from the customer or client information technology infrastructure. The 'as a service' power balancing engine instance can allow clients or customers to 'opt-in' to various energy reduction aggregation levels which can take pressure off the local power grid, during times of: an energy emergency, predicted high demand on the grid, or sub optimal energy input ratios determined by the fuel mix of renewable inputs, coal, gas, nuclear, etc.

The inputs from the grid can also be fed into a sustainable job scheduler service instance (e.g., sustainable job scheduler engine instance), which can determine the most sustainable times for regular system jobs to occur. Customers can also opt into an 'Active' approach, or a 'Passive' approach, wherein the former can implement newly generated schedules automatically, with the latter allowing the customer to accept/reject newly generated schedules. Finally, a third 'as a service' instance (e.g., catastrophe grid relief engine instance) can prioritize critical infrastructure in the event of a catastrophe being declared, to relieve pressure on the grid should it be required by critical services (e.g., emergence response in cases of natural disasters, . . . ).

The respective functionalities and facilities provided, individually and/or in combination, by the power balancing engine instance, sustainable job scheduler engine instance, and/or catastrophe grid relief engine instance can be initiated using sharable certificates, for example, that can have been distributed to clients and customers of data storage services operators, cloud managed service platform operators, and the like. The certificates can include data that can represent whether or not a client or customer has opted in or opted out of the various functional aspects described in the context of the power balancing engine instances, sustainable job scheduler engine instances, and/or catastrophe grid relief engine instances. These certificates in various embodiments can be shared or can be shareable to downstream customers/clients (e.g., subordinate customers/clients of the customer, subcontractors, and/or regulatory bodies). Further, individuated displayable customer dashboards can be used to display and/or convey: energy statistics for defined periods of time, energy reduction events determined and/or identified, during the defined time periods, by the various engine instances (e.g., power balancing engine instance, sustainable job scheduler engine instance, and/or catastrophe grid relief engine instance), energy mixes (e.g., amounts of power supplied through fossil fuel based power sources; power generated using nuclear fission; power generated using environmentally sustainable power sources such as solar, wind, geothermal, nuclear fusion, hydrogen fuel cells, electric/power storage units (batteries), etc.) that can have occurred during the defined period of time, tasks/software in execution that have been rescheduled during the defined time period, total green scores, and total estimated energy savings.

Prior to describing the various system and method embodiments that can be utilized to facilitate sustainable enterprise wide energy balancing it is constructive to set forth, without limitation or loss of generality, some definitions used in this disclosure. A grid/local grid as used herein can represent a sub-section of an electric transmission power grid, wherein the electric transmission power grid operator has the facilities to be able to be remotely monitored, providing continuous supply and demand metrics, energy mix data, predictive forecasting data in relation to future energy supply shortfalls and increases in demand load, and histories related to past supply and demand for energy. Further, in some embodiments a data center associated with an independent (e.g., segregated or physically isolated)

sub-section of the electric transmission power grid can be considered a local grid, and as such, the data center can have facilities and/or functionalities to provide the continuous supply and demand metrics, energy mix data, etc, Runbooks can be representative of groups of automated tasks used to control various equipment and/or machines (and/or underlying software in execution—task in operation, operating systems, multithreaded applications in execution, virtual machines, etc.) that can comprise at least one or more processors during the course of groups of defined events. For instance, a runbook can provide an outline as to how, in the case of triggering event A occurring, that cascading actions B, C, and/or D need to be triggered to ameliorate, rectify, and/or resolve triggering event A.

Figure 8:
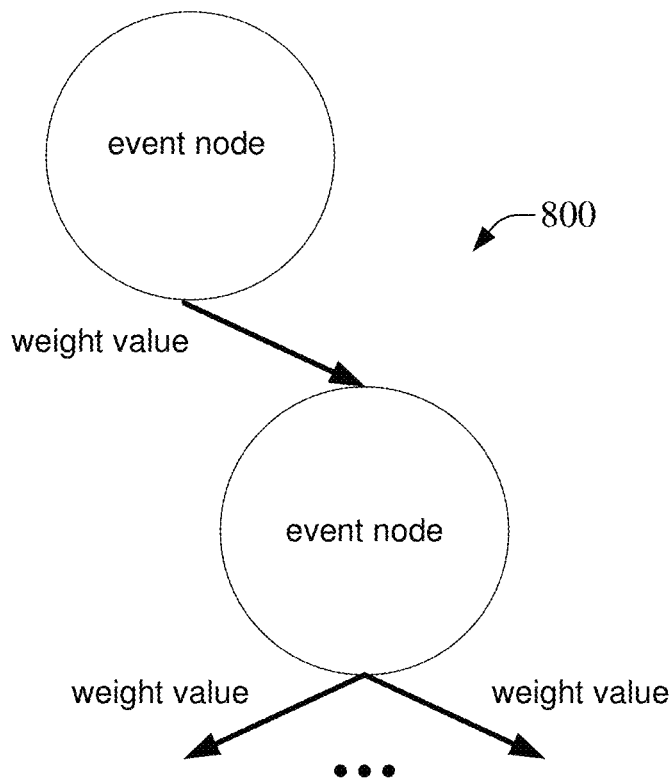
FIG. 8 illustrates a neural network node that can be used to achieve sustainable enterprise wide energy balancing, in accordance with various non-limiting example embodiments.

In accordance with this disclosure, the runbooks described herein in some embodiments, can be implemented as collections of rule-based artificial intelligence models (e.g., rules to be applied in defined energy crisis events-natural disasters, attacks and/or sabotage to the electrical grids, situations where a current demand (or a predicted demand) for generated and transmission electricity outstrips a current supply (or predictive supply) of the electricity, . . . ). In additional and/or alternative embodiments groups and/or cascading hierarchies of neural network nodes representing events (e.g., associated with determinable triggering events such as natural disasters, attacks and/or sabotage to the electrical grids, and the like) can be used, wherein each event, as depicted in FIG. 8, is connected by one or more weighted links to a multitude of subordinate neural network nodes, and wherein each of the weighted links are associated with various probabilities as to whether or not a subordinate neural network node should or should not be triggered. In regard to the hierarchies of neural network nodes, it will be observed that a group of initial nodes can be representative of input events to the neural network. These input events can trigger events such as a prediction that a demand for electricity will be greater than the predicted supply of electricity.

In this description system jobs can be representative of the automatic execution of tasks (e.g., processes) on equipment required for maintenance, upkeep, disaster recovery processes, etc., usually scheduled to execute at regular intervals, typically defined by default parameters and/or customer input. A catastrophe can be an event that can be declared due to natural disaster (hurricane, earthquake, flooding, solar flare, etc.), man-made disaster (terrorism, nuclear accident, civil disorder, etc.), or an unprecedented event of significant scale. Generally, catastrophes are confined to geographical areas as defined by a local grid.

In regard to the inputs that initiate actions performed by the described systems, machines, apparatuses, and the like, these can be categorized as pertaining to: (1) an immediate risk to the power grid; (2) predictive risk to the power grid; and (3) energy fuel mix. Concerning an immediate risk to the power grid, this input can apply to any region which has power grid alerting processes in place. For instance, using EirGrid plc—the state-owned electric power transmission operator in Ireland—as an example, during times of demand closing in on supply, three statuses can be issued. (a) Alert—"There is an elevated risk that there may not be enough electricity to meet the demand on the system. It can also describe the risk of breaking operational security limits on key measures like frequency or voltage;" (b) Emergency—"When there is a high risk of failure to meet the demand for electricity on the system, or of breaking operational security limits;" and (c) Blackout—"When more than 50% of the electricity system has lost power, or when the system has been split into sections, some of which are without power."

With regard to inputs categorized as predictive risks to the power grid, these inputs generally apply to any region which has telemetry available to be consumed by the systems and/or method set forth in the embodiments detailed in this disclosure, along with any predictive metrics, and/or forecasting trend data that can be supplied by the electric power transmission operator. The detailed systems and methods can monitor these metrics in real time, and can make inferences and predictions based on historical data that can have been supplied by the electric power transmission operator and can have been persisted to databases of agglomerations of databases.

With respect of inputs classified as energy fuel mixes, these inputs can apply to any region which has telemetry data (e.g., the collection of measurements or other data at remote points and the automatic transmission of the collected data to receiving equipment for monitoring) to be consumed by various embodiments described herein. The telemetry data can be used to determine the ratio of supply mix in real time. For instance, telemetry data can, in real time, be used to determine the generative sources from which the received energy was generated (e.g., fossil fuel, coal, natural gas, nuclear, solar, wind, geothermal, . . . ). In instances where no telemetry data is available or is not offered by the electric power transmission operator, and/or in addition to the supplied telemetry data from the electric power transmission operator, the disclosed systems and/or method, in accordance with some embodiments, can also independently obtain, determine, and/or derive these metrics; for example, by monitoring local weather conditions and the like. The systems and/or methods, based on the monitoring of local weather conditions and determinations based on other acquired telemetric data, can supply/output recommendation data.

Nevertheless, regardless of whether or not the electric power grid operator supplies telemetric data, or whether the disclosed systems and/or methods independently determine and/or derive the telemetric data, the recommendation data generated by the systems and/or methods can comprise at least: (a) regional grid optimization score—which can provide an indication of the sustainability of the grid in real time; (b) customer generation optimization score—which can provide an indication of the customers own energy generation at a point in time; and (c) suggested power source—which can provide an indication if the customer's own energy source (energy storage units (batteries), wind turbine generators, solar panels, petrol/diesel powered backup generators, natural gas powered backup generators, . . . ) should be used, or whether the customer should continue being supplied from the electric transmission power grid.

Additional input to the disclosed systems and methods can include customer modifiers. Customer modifiers can include (1) aggression levels denoted as 'low' (e.g., 0 can be used to denote low aggression levels) or 'high' (e.g., +1 can be used to denote high aggression levels). In regard to aggression levels, it should be noted that these levels are defined by customers of the service, wherein a value of 0 has the least impact (e.g., represents normal operating conditions) and a value of +1 has the most impact on the systems operational state. Concerning the values assigned to high and/or low aggression levels, a range of values can be used. For instance, a range of real number values from 0 to 100 can be used with equal functionality and facility. Further, ranges of discrete integer values can also be employed, as well color spectrum values, associated hue values, and/or color intensity/brightness values (e.g., values associated with the spectrum of visible light—red to violet) can also be adopted without departing from the ambit of this disclosure.

Aggression levels in general can be based on whether or not a customer or client is running or executing critical production processes; production processes that are not generally time sensitive; and/or processes that are not production processes, the execution of which do not impinge on the clients' production schedules. For instance, a manufacturer of aviation turbine engines may execute computational fluid dynamics processes that construct computational models of aviation combustor components. The developed computational models can take multiple weeks of continuous execution of the computational fluid dynamics code to generate and test the computational model in accordance with engineering principles and the many governmental regulatory requirements necessary to obtain certification of the ultimately developed engine(s). Such a client could rank equipment executing such computationally intensive code as being both highly time sensitive and extremely sensitive to power outages, and as such the aggression level assigned by a client/customer would be high. Conversely, a client or customer that is in the business of executing processes that effectuate employee payroll, depending on employee payment periods, can rank its aggression level as low for certain defined time periods and high for other defined time periods. For these aggression levels, there can thus be an associated runbook that outlines how a specific customer/client wishes its equipment and the tasks/processes executed thereon to be handled in the event of brownouts and/or total power grid transmission failure, for example. As noted earlier, a runbook can represent a compilation of defined procedures and sequences of operations that system administrative equipment can perform. For purposes of exposition of this disclosure the runbook and the defined procedures and sequences of operations contained therein can be represented as one or more neural networks and/or one or more rule based model.

In the case of the neural network, triggering events and pursuant actions detailed in the runbook can be represented as nodes (or node clusters) in the neural network, and each of the nodes representative of events and consequent actions can be interconnected using links, wherein each of the links that interconnect the nodes (or clusters of nodes) can be assigned weightings that represent whether or not a interconnected subsequent node (or interconnected cluster of nodes) should be triggered. For ease of conception, in some instances the neural network can be conceived as a directed graph where nodes represent vertices and links represent directed edges (or arcs), a mixed graph where first vertices are directed to second vertices via directed edges while third vertices are connected to fourth vertices via undirected edges, and/or a weighted graph where nodes represent vertices and the edges that interconnect with the vertices are associated with determined or determinable probability values (e.g., the determined or determinable probabilities indicate the direction of the edges). Further, in other instances the neural network can be envisioned as being a tree structure (e.g., a multi-dimensional hierarchical tree), wherein an initial node at the apex of the tree represents an initiating event that when triggered leads to a cascading activation of subordinate nodes. It should be observed that the disclosed neural networks can be chained. For instance, a first neural network representing a first runbook detailing a group of first actions that should be activated in response to first triggering events can be chained to a second neural network representing a second runbook detailing groups of second actions that should be initiated in response to second triggering events, wherein at least one of the second triggering events is included as a neural network node in the first neural network with an assigned weighting value that points to the second triggering event included in the second neural network.

In the context of runbooks being represented as rule-based models, for each action comprising a runbook, a rule can be formulated. For example, a simple rule-based model can be constructed as one or more grouping rules formulated as: "event::action" rule tuples. Each rule tuple thereafter can be linked to other rule tuples using conditional constructs, such as IF, THEN, ELSE, and/or CASE constructs. For instance, a rule construction states: IF "eventA::actionA" ELSE "eventB::action", when event A is activated, action A is performed, else event B is initiated, and action B is performed. Probability weight values can be associated with each rule tuple, such that by using the various associated probability weight values certain rule tuples can either be triggered at a first instance in time and/or not triggered at a second instance in time based on the probability weight values. As described in relation to the neural network embodiments, rule based models can be chained to one another. For example, a first runbook can outline first procedures and first processes to be performed in the course of a first triggering event and a second runbook can outline second procedures and second processes the be performed in the course of a second triggering event, it is possible that one or more of the first procedures or first processes invokes procedures and processes included in the second runbook.

In regard to runbooks, these can be categorized based on aggression levels. Thus, the disclosed systems and methods, based on an event being triggered, can determine an aggression level and thereafter identify a runbook associated with an appropriate aggression level and then perform the procedures and processes detailed in the runbook. In some embodiments the aggression level can take the form of binary values (e.g., '0' for low aggression, and '1' for high aggression). In other embodiments the aggression level can take the form of a range of values (e.g., a range from 0 for low aggression and +1 for high aggression). In further embodiments, aggression levels can be represented using values associated color coding, wherein a first value can represent a color in the visible electromagnetic spectrum, a second value can represent a hue associated with the color, and a third value can represent an intensity or brightness associated with the both the hue and the color. In regard to the latter embodiments, viz. using first values, second values, and third values associated with the electromagnetic spectrum, the combination of first, second, and third values can be used, for example, to display to display device aggression levels within an unlimited continuum of varying gradations. For instance, the most intensely displayed green hue can represent the lowest level of aggression, while the most intensely red hue can represent the highest level of aggression.

The aggression levels associated with the runbooks can provide an ordering in regard to which runbook should take priority during times of crises. For instance, runbooks associated with high levels of aggression can take precedent over runbooks associated with low levels of aggression. It should be noted that the associated aggression levels can be specified by a client/customer based on their business model and their information technology infrastructure. Further in connection with runbooks, each procedure and/or process included in the runbook can be assigned an aggression level by the client. In this regard, the values associated with the assigned aggression levels associated with each process and/or process included in the runbook can be used to assign a weighting to individual rules (in the rule based model) that can be generated based on the runbook. Similarly, in the context of the neural network(s) generated based on the runbook, the aggression levels assigned to the procedures and processes detailed in the runbooks can also be determinative of the weightings associated with the arcs that interconnect each of the event nodes.

Additional customer modifiers can include electric grid operator unit rates for the provision of electricity. This rate data can be used to determine average energy mixes between disparate energy sources (e.g., fossil fuel generated power, nuclear power, wind generated power, hydroelectric power, solar, local electricity storage units, natural gas generation, and the like). The rate data can also be used to provide estimations in relation to costs associated with using a defined energy source versus the savings associated with using the defined energy source (e.g., a cost benefit analysis). The rate data can also be used in a multivariate objective optimization analysis of the use of the various generative power sources. The results of these various analytic techniques can be used in determining weightings to be associated with rules in the rule-based model and/or the linkages between event nodes in the neural network model. Further, the results can also be sent to infrastructure equipment affiliated with electric power grid operator detailing the actions and tasks that were performed in defined periods of time.

Other customer modifiers can also include production and/or non-production workloads. Here the customer or client can make differentiations between the various runbooks (e.g., production runbooks and non-production runbooks) to be executed, or not executed, during various crisis events (e.g., earthquakes, flooding, national emergency, . . . ). As will be appreciated by those of skill in the art, customers and/or clients can also make these differentiations with regard to individual procedures and/or processes included in the runbooks that are to be executed in response to various crisis events (or non-events-normal business practice).

Additional customer modifiers can include: (a) whether or not client/customer physical infrastructures (e.g., buildings) include uninterrupted power supplies (UPS)—this data can used to alter the processing logic flow of this disclosure, to disconnect the UPS from the grid based on battery capacity; (b) whether or not backup power generators (e.g., diesel, natural gas, . . . ) are available and are powered up during a power outage event; protected business hours—this information allows the customer/client to specify hours during which they wish to opt-out or opt-in of any actions, and/or reduce their aggression levels; (c) whether or not the customer/client wishes live replication/automatic transfer of critical business processes (or each and every process) in execution to switch over to one or more disaster recovery site, and the specific details associated with the critical business processes (and/or each and every process) in execution, and the one or more disaster recovery site; and (d) criticality of services—this information allows customers/clients to designate their stack(s) (e.g., their collections of runbooks to be implemented during power grid insufficiencies and/or power grid failures) into a defined number of categories. For instance, in regard to criticality of services, customers/clients can categorize their stacks into: (A) a first defined category denoting a critical level of criticality representative of emergency services, hospital service, and the like; (B) a second defined category denoting an essential level of criticality representing essential services, etc.; and (C) a third defined category denoting a non-essential level of criticality.

The disclosed systems and methods, in accordance with various embodiments, provide a system, apparatus, or device comprising: a processor; and a memory that stores executable instructions that, when executed by the processor, facilitate performance of operations. The operations can comprise: in response to receiving, from first equipment associated with an electric power generation and transmission operator entity, a group of input data representing a standardized phrase, lexically and semantically parsing the standardized phrase to identify a initiating event; and based at least on the initiating event, determining that an initiating threshold value associated with the initiating event has exceeded a defined risk threshold value, and initiating execution of a flow of processes representing a customer specified collection of runbooks, wherein the execution of the flow of processes is performed by second equipment associated with a customer and located at a remote high performance compute operator entity location.

Further operations can include in response to determining that the initiating threshold value associated with the initiating event has fallen below the risk threshold value, adjusting weighting values associated with each process comprising the customer specified collection of runbooks. Each runbook of the customer specified collection of runbooks can comprise at least a process that is ordered based on an aggression value, wherein the aggression value is represented based on a first value, a second value, and a third value of a color spectrum. The first value can represent a color value associated with the color spectrum, the second value represents a hue value associated with the color value, and the third value represents a brightness value associated with the color value. The aggression value can be used to display, to a display device, a color representation of the process in execution. One of the group of input data represents predictive risk to grid data, and wherein the operations further comprising, in response to receiving the predictive risk to grid data, determining trend data associated with a sustained viability associated with maintaining a supply of continuous electrical power to a region of a electric power generation and transmission grid associated with the electric power generation and transmission operator entity.

Other operations can include based on the trend data associated with the sustained viability of maintaining the supply of continuous electrical power to the region, determine a time window within which to execute the flow of processes on the second equipment, based on the trend data and the predictive risk to grid data, perform correlations that correlate the trend data to comprise correlation data, the predictive risk to grid data, and the time window within which to execute the flow of processes on the second equipment, and based on correlation data, customer modifier data associated with the flow of processors executing on the second equipment, generate recommendation data representative of augmented time windows with which to execute in the flow of processes on the second equipment.

In accordance with further embodiments, the subject disclosure describes a method, comprising a sequence of acts that can include: receiving, by a device comprising a processor, a group of input data representing a standardized phrase, wherein the group of input data is received from first equipment associated with an electric power generation and transmission operator entity; semantically parsing, by the device, the standardized phrase to identify an initiating event; in response to identifying the initiating event, determining, by the device, that an initiating threshold value associated with the initiating event has fallen below a defined risk threshold value; and executing, on remote second equipment, a flow of customer defined processes representing a group of runbooks, wherein the remote second equipment is located at a cloud management service platform operator entity site.

In regard to the foregoing, the standardized phrase can be a representation of a multidimensional matrix barcode.

Other acts can include in response to determining that the initiating threshold value associated with the initiating event exceeds the risk threshold value, adapting, by the device, weighting values associated with each process comprising the customer specified collection of runbooks, wherein each runbook of the customer defined processes representing the group of runbooks can comprise at least one process that is ranked based on an aggression value, and wherein the aggression value is represented based on a first value, a second value, and a third value of a color spectrum. The first value can represent a color value associated with the color spectrum, the second value can represent a hue value associated with the color value, and the third value can represent a brightness value associated with the color value. The aggression value can be used to display, to a display device, a color representation of the process in execution.

One of the group of input data can represent predictive risk to grid data, and wherein the operations further can comprising in response to receiving the predictive risk to grid data, determining, by the device, trend data associated with a sustained viability associated with maintaining a supply of continuous electrical power to a region of a electric power generation and transmission grid associated with the electric power generation and transmission operator entity. Further, based on the trend data associated with the sustained viability of maintaining the supply of continuous electrical power to the region, determine, by the device, a time window within which to execute the flow of processes on the second equipment, and based on the trend data and the predictive risk to grid data, perform correlations that correlate the trend data to comprise correlation data, the predictive risk to grid data, and the time window within which to execute the flow of processes on the second equipment.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: receiving a group of input data representing a standardized phrase, wherein the group of input data is received from first equipment associated with an electric power generation and transmission operator entity; parsing the standardized phrase to identify an initiating event; in response to identifying the initiating event, determining that an initiating threshold value associated with the initiating event has fallen below a defined risk threshold value; and executing, on remote second equipment, a flow of customer defined processes representing a group of runbooks, wherein the remote second equipment is located at a cloud management service platform operator entity site. Each runbook of the customer defined processes representing the group of runbooks comprises at least one process that is ordered based on an aggression value, wherein the aggression value is represented based on a first value, a second value, and a third value of a color spectrum.

Now in reference to the Figures. FIG. 1 depicts a system 100 that can achieve sustainable enterprise wide energy balancing, in accordance with various example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 100 can comprise balancing engine 102 that can be in operative communication with processor 104, memory 106, and storage 108. Balancing engine 102 can be in communication with processor 104 for facilitating operation of computer-executable instructions or machine-executable instructions and/or components by balancing engine 102; memory 106 for storing data and/or computer-executable instructions and/or machine-executable instructions and/or components; and storage 108 for providing longer term storage of data and/or machine-readable instructions and/or computer-readable instructions. Additionally, system 100 can also receive input 110 for use, manipulation, and/or transformation by balancing engine 102 to produce one or more useful, concrete, and tangible result, and/or transform one or more articles to different states or things. Further, system 100 can also generate and output the useful, concrete, and tangible result and/or the transformed one or more articles as output 112.

System 100 in conjunction with balancing engine 102 can receive, as input 110, a grouping of inputs comprising immediate risk to grid data representing indications from an electric power transmission operator that a demand value for electric power is approaching a supply value for the electric power. Concerning immediate risk to grid data this indication can take the form of 'alert data' that in turn can take the form of a standardized statement comprising strings of alphanumeric characters (inclusive of characters undetectable to the human eye), such as: "There is an elevated risk that there may not be enough electricity to meet the demand on the system." The received standardized statement can thereafter be lexically parsed by system 100 to interpret the meaning of the standardized statement. In some embodiments, the standardized statement can take the form of a multidimensional barcode. In other embodiments the standardized statement can be representative of a quick response code (QR code), or any other type of machine comprehensible code representation, such as one or more representational state transfer application programming interface description language (e.g., HTTPS REST). Other information that can be included in the standardized statement (particularly, when the standardized statement takes the form of linear barcodes and/or a multidimensional matrix barcodes) can include information describing the risk of breaking operational security limits on key quality of service measurements like maintaining standard frequencies and/or voltages, variations and surges to which can be extremely deleterious to the operation of electrical and/or electronic equipment.

Further, in connection with immediate risk to grid data, the indication can take the form of 'emergency data' that in turn can take the form of another standardized statement comprising strings of alphanumeric characters such as: "When there is a high risk of failure to meet the demand for electricity on the system or of breaking operational security limits." Other indications under this heading can include 'blackout data' that can take the form of a third standardized statement comprising strings of alphanumeric characters, such as: "When more than 50% of the electricity system has lost power, or when the system has been split into sections some without power." It will be observed by those skilled in this field of endeavor that the 'alert data,' 'emergency data,' and/or 'blackout data' can be representatively encoded in the form of one or more machine readable multidimensional barcodes.

Balancing engine 102 can also receive, as input 110, predictive risk to grid data. Predictive risk grid data can be included in the grouping of data received from an electric power transmission operator. The predictive risk to grid data can comprise telemetric data representative of any region within which the electric power transmission operator generates and transmits electric power. In instances where the electric power transmission operator in unable to supply predictive risk grid data, balancing engine 102 has the functionality and facility to provide, in real-time, the predictive risk data using gathered and/or persisted (e.g., in repositories of databases) telemetric data that can be publicly available in conjunction with one or more artificial intelligence rule-based and/or neural network predictive models. In regard to gathered and/or persisted telemetric data, this data can be historical data and/or data gathered via live feed from remotely situated telemetric instruments.

Additionally, balancing engine 102 can further receive, as input 110, energy fuel mix data. The energy fuel mix data can be included in the grouping of data that can have been received from the electric power transmission operator. The energy fuel mix data can include information on the mix of energy sources used to generate the supplied electric power. In cases where a electric power generator and/or transmission operator is unable to supply the mix of energy sources that were used to generate the supplied power, balancing engine 102 has be capability to use telemetric data received from multiple remotely situated telemetric devices to monitor and predict an appropriate energy source mix, and thereafter provide one or more recommendations based on the predictions. The recommendations (e.g., recommendation data) can include: (i) regional power grid optimization scores that can provide indications of the sustainability of the electric power grid in real time; (ii) customer generation optimization scores that can provide indications of a customer/client's abilities to generate its own power at a point in time; and (iii) suggested power sources that can provide indication of whether a customer/client's own power generation capabilities, such as power storage units (batteries), solar panels, fossil fuel powered generators, and the like, should be used to augment the electrical power that is being received from the power grid, supplement the power that is being received from the power grid, or contribute, using the customer/client's power generation equipment (e.g., wind power generation clusters, solar power generation farms, . . . ), customer/client generated power back to the power transmission grid.

With reference to optimization scores, these values can be used to determine assigned fuel mix values specific to particular regions of the electrical power generation and transmission grid, wherein for each fuel source (e.g., renewables, gas, coal, imported fuel sources, etc,) a value between −1 to +1 can be assigned. For instance, the assigned fuel mix values can be: "renewable=1; gas=−0.1; coal=−0.9; imported fuel sources=−0.2." This illustrative fuel mix can ensure that there is a preference for the use of electricity that is generated from renewable sources, such as solar power and wind power, and that the use of electricity generated using coal as a fuel source is discouraged.

Additionally, customer optimization scores can also be taken into account in determining fuel mix allocation values. The customer optimization scores can be specific for each customer. For example, some customers can be more tolerant to receiving electric power generated using coal rather than renewable energy sources, particularly during times of electric power insufficiencies, whereas other customers may prefer to use other less polluting power generating fuel types, such as gas, solar, etc. To enable this functionality, customers can specify defined power generation weightings within a range, for example, of −1 to +1 as their customer optimization scores.

With further reference to optimization scores, a defined grid stress threshold value can be used, wherein in response to one or more of the optimization scores falling below the define grid stress threshold value, Additional inputs that can be received by system 100 and balancing engine 102 can also include customer modifiers. Illustrative customer modifiers can include (1) aggression levels and runbook levels; (2) energy provider information inclusive of unit rates for the supply of generated electric power; (3) the client/customer's production or non-production workloads; (4) whether uninterrupted power supply equipment and/or components are part of a customer/client information technology infrastructure; (5) whether or not the customer/client wishes live replication/automatic transfer of critical business processes in execution to switch over to one or more disaster recovery site, and the specific details associated with the identified critical business processes, and the one or more disaster recovery site; and (6) the criticality of the services to be rendered to the customer/client.

It should be observed that frequencies of telemetry requests/pull requests to the disclosed systems can be tailored to be non-disrupting to on-going production processes, while the execution of runbooks on the systems can be tailored to avoid spikes in energy usage.

Balancing engine 102, in response to determining that a triggering event has occurred in, or based on triggering events having occurred in, at least one of the received (a) immediate risk to grid data; (b) predictive risk to grid data; and (c) energy fuel mix data, can initiate a flow of processes included in groups of runbooks that can have been customized based on customer/client feedback. The groups of runbooks can form a stack of machine-readable instructions, that when executed perform operations. Generally, triggering events that can initiate the flow of processes can be a power insufficiency for a region of regions to which the electric power transmission operator is responsible for supplying power to and to which the customer/client is located. Thus for example, based at least on immediate risk to grid data received from the electric power generation and transmission entity and determining that a defined risk threshold value has been surpassed (or as the case maybe, the determined risk threshold value has not attained a minimal defined risk threshold value), balancing engine 102 can commence execution of the flow of processes comprising the customized collection of runbooks. Similar processes can be performed in the case of inputs pertaining to predictive risk to grid data, and (c) energy fuel mix data.

In an instantiation of one or more of the individuated stacks of machine-readable instructions included in the groups of runbooks customized based on customer/client feedback, balancing engine 102 can check all solutions (e.g., power generation solutions—nuclear, wind generation, solar power generation, power generation, uninterrupted power supply, and the like) on the electric power grid for alternative power generating sources, and for each identified solution determine whether the customer/client has opted in or opted out for the identified solution. A customer/client's opt in's and/or opt out's can be included in collections of customer specific certificates that can identify the customer/client's wishes and intentions with regard to the sourcing of their supply of electrical power.

Balancing engine 102, based on a customer/client having opted in to a particular energy sourcing solution, can apply the above noted customer modifiers to each of the groups of runbooks (inclusive of developed rule-based models and/or neural network based models) and execute the stacks of machine-readable instructions. It should be noted that for each stack that is executed, the appropriate customer defined aggression levels will be taken into account by balancing engine 102.

Balancing engine 102, in response to determining that a determined risk value has fallen below a defined risk threshold (or conversely, the determined risk value exceeds a defined risk threshold value), can cease execution of the flow of processes since the event that set the flow of processes in execution has ceased to warrant execution of the process flow. It is at this point where weightings associated with the arcs connecting the event nodes associated with the neural network models, and/or the weightings associated with triggered rules in the rule based models can be adjusted.

Figure 2:
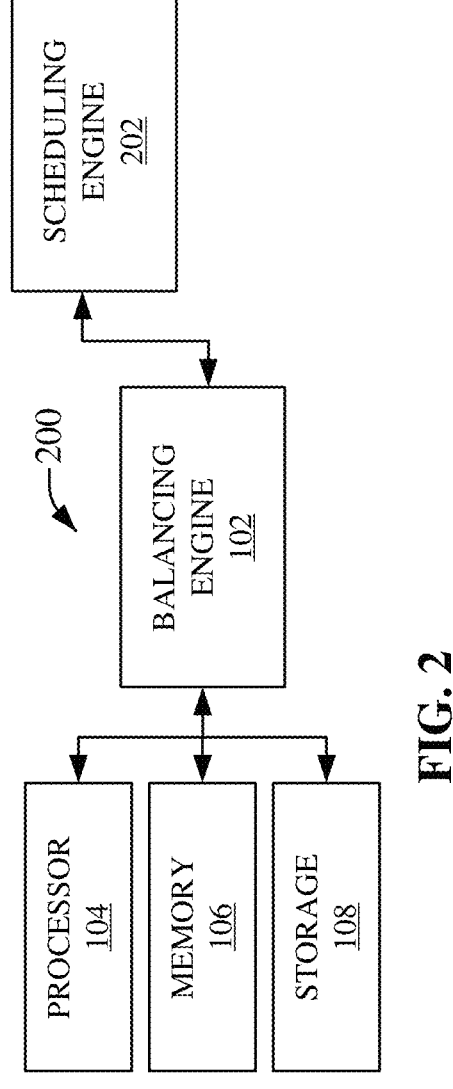
FIG. 2 depicts a block diagram of a system for achieving sustainable enterprise wide energy balancing, in accordance with various non-limiting example embodiments.

FIG. 2 depicts an additional system 200 that can achieve sustainable enterprise wide energy balancing, in accordance with various example embodiments. System 200, as illustrated, can include balancing engine 102 that can perform the operations set forth above. Additionally, system 200 can include scheduler engine 202. Scheduler engine 202 can be triggered based on predictive risk to grid data and/or energy type data. When scheduler engine 202 receives predictive risk to grid data and/or energy type data, it can determine whether or not these input data streams satisfy defined conditions. Both the predictive risk to grid data and the energy type data can be used to determine trends based on each of the predictive risk to grid data and the energy type data in regard to the region of regions that an electrical power generation and transmission operator entity services the customer/client's information technology infrastructure. Further, the predictive risk to grid data and the energy type data can be used to determine optimal time intervals during which scheduler engine 202 should compute for the execution of processing intensive loads executing on equipment included in a customer/client's information technology infrastructure. Scheduler engine 202, based at least in part on the predictive risk to grid data and the energy type data can identify performance trends, and further can perform correlations with system jobs operational on system 200. The data related to system jobs can be added to one or more databases together with trigger times, average execution durations, and compute loads. The data persisted to the database of databases can then be used to for predictive trend analysis, the analytic output of which can be used in the future to better predict power grid insufficiencies, and determine that any processes in execution are executing within optimal time windows. In this regard, scheduler engine 202 can check the customer/client's defined parameters and determine new suggested time windows for the execution of their software. If the customer/client has opted for the 'Active' approach, scheduler engine 202 can automatically apply the new determined time intervals to the processes in execution, and generate and transmit notifications to customer/client infrastructure equipment. It should be noted, that even when the customer/client has opted for the 'Active' approach, the customer/client can always be provided the option to revert changes and suspend future actions for identified processes. In the instance of customers having opted for the 'Passive' approach, scheduler engine 202 can provide such customers/clients with generated notifications of the trend analysis and can permit the customer/client to opt in to accept the new determined time intervals.

In regard to the analysis of trends provided by scheduler engine 202, the data that can have been persisted to a database of databases in regard to the trend analysis performed by scheduler engine 2022 can also be used to modify weightings associated with the rule-based models and/or the neural network based models.

Figure 3:
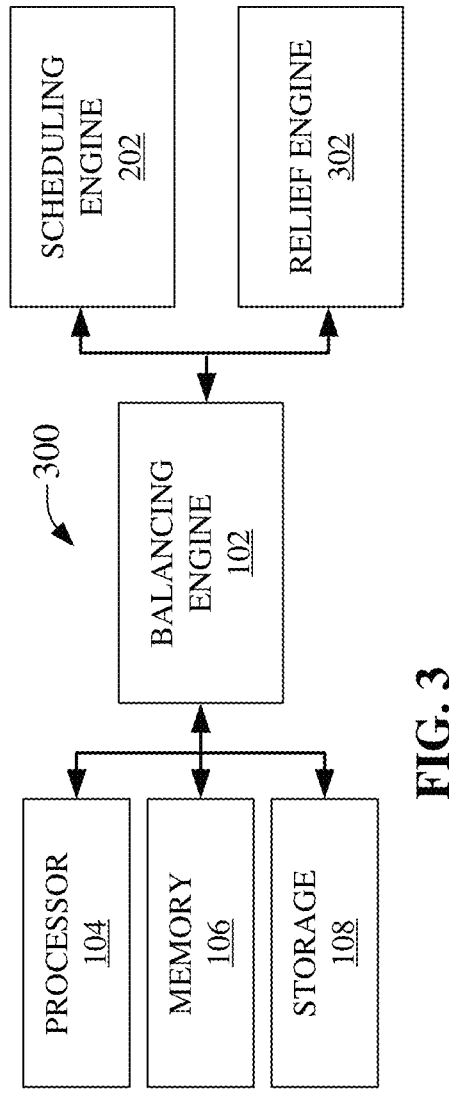
FIG. 3 illustrates another block diagram of a system for achieving sustainable enterprise wide energy balancing, in accordance with various non-limiting example embodiments.

FIG. 3 illustrates a further system 300 that can achieve sustainable enterprise wide energy balancing, in accordance with various example embodiments. In accordance with this embodiment, system 300, in addition to balancing engine 102 and scheduler engine 202 can include relief engine 302. Relief engine 302 can be initiated, for example, when a catastrophe variable is set to true. The objective of relief engine 302 is to relieve power demand from noncritical workloads (e.g., the execution of processes that are not critical to the underlying success of a customer/client's business model). Hence, during times of catastrophe (e.g., power grid failures, power grid insufficiencies, regional and/or national natural disasters, manmade disasters, and the like), relief engine 302 in collaboration with balancing engine 102 and/or scheduling engine 202, can place noncritical and executing processes in states of stasis for the duration of the emergency/catastrophe (e.g., while system 300 determines that the source of the emergency/catastrophe is ongoing—the catastrophe value is set to true), thereby prioritizing the continued execution of business critical processes—processes that are critical to the viability of a client/customer's business enterprise.

Accordingly, while the catastrophe value is set to true, relief engine 302 can monitor the fluctuations in the supply and demand of regional (local) segments of the electric power transmission grid to determine whether, and if, the power being transmitted and supplied by the regional aspects of the electric power generation grid exceeds the demand for the power being generated by the regional segments of the electrical power transmission grid.

Once the supply of electrical power reaches a first threshold value with regard to the demand for electrical power, a customer/client defined group of first runbooks comprising customer/client specified orderings and/or groupings of processes that need to be executed in response to the invocation of disparate classifications of events (e.g., Critical, Warning, Predicted-Critical, Predicted-Warning, Normal, etc.), can be initiated by relief engine 302. In this instance, the first threshold value can be associated with a critical level value, for instance a binary value (e.g., 0 or 1) that can be used during times of emergency (e.g., during floods, natural disasters, manmade disasters, and the like). Further, the group of runbooks can be rankings or orderings of processes defined by a customer/client that the customer/client deems to be the most crucial to be executed during times of regional or national emergencies.

Relief engine 302, in response to determining that the level of criticality has fallen, for example, from 'Critical' to a lesser value of 'Warning' can continue monitoring the power transmission grid to determine when the supply of electrical power exceeds (moderately) the demand for electric power. The determination of whether or not the supplied electrical power exceeds the demand for electric power can be based for instance on a second threshold value. In response to the criticality of the event being lowered from a first value (e.g., binary value '0') to a second value (.g., binary value '1'), relief engine 302 can commence executing second groups of customer/client specified run books comprising second orderings, rankings, and groupings of processes to be executed while the level of criticality is determined to be at a warning level.

Relief engine 302, in response to determining that the supply of power from the logical grid significantly exceeds the demand for power, can change the warning value from the second value to a first value (e.g., changing the value from indicating that a warning is extant to a value indicating that the warning is no longer pertinent). For example, relief engine 302, based on both the critical flag value and the warning flag value each being set to binary values '0' (e.g., off), can commence normal operations, running customer/client defined rulebooks the detail normal operations.

In instances, where, during a warning level event, relief engine 302 is unable to access and/or interact with the power grid, relief engine 302, at defined periodic time intervals can poll the grid to determine the grid's availability, where the grid is unavailable relief engine 302 can change the criticality level from a first level value to a second level value (e.g., turn off the warning level value-set the warning level value to binary '0' and set the critical warning level value to binary '1').

FIGS. 4-7 illustrate flowcharts, time sequences, and/or methodologies for performing operations corresponding to system 100, system 200, and system 300 in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies and/or time sequences in accordance with the disclosed subject matter. In addition, those skilled in the art will understand and appreciate that the time sequences and/or methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
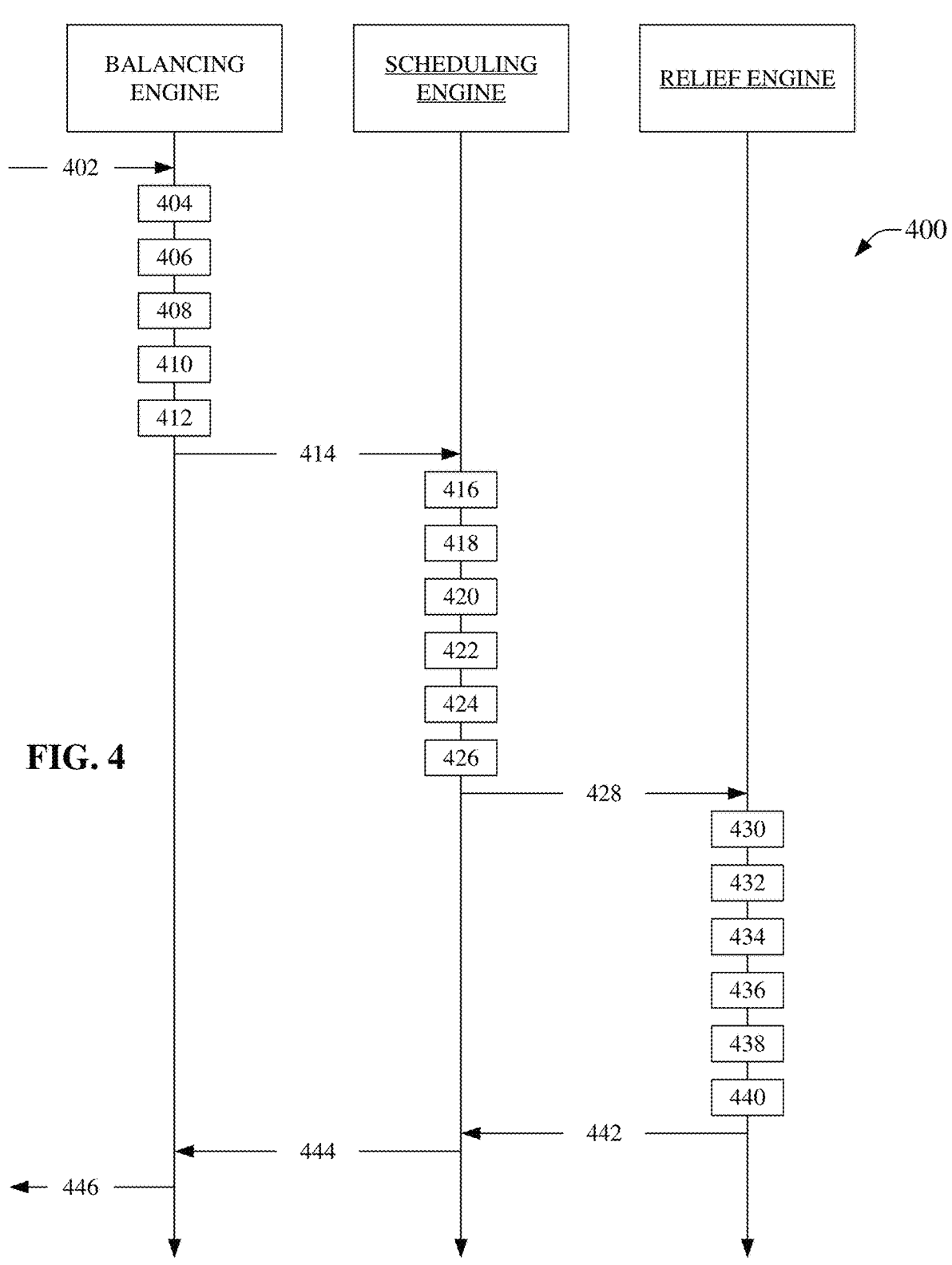
FIG. 4 illustrates a time sequence chart or a method for achieving sustainable enterprise wide energy balancing, in accordance with various non-limiting example embodiments.

FIG. 4 depicts a time-sequence diagram or flow diagram 400 to facilitate sustainable enterprise wide energy balancing, in accordance with various detailed implementations and/or described embodiments. The time-sequence can commence, at act 402, receiving, from an electric power generation and/or transmission operator entity (e.g., an electrical grid operator) a group of inputs comprising, for example, one or more of immediate risk to grid data, predictive risk to the grid data, and/or energy mix type data.

In regard to immediate risk to grid data, this data can represent indications received from, for example, a power generation and/or transmission operator entity (e.g., producers of electricity generated from solar energy, fossil fuel generated electricity, electricity derived from nuclear fusion or electricity obtained from nuclear fission, electricity generated using hydrogen fuel cells, electricity generated by hydropower and subsequently stored to a phalanx of batteries, etc.). The received indications can be determined, by the power generation and/or transmission operator entity, based for instance, on amounts of power that the power generation and/or transmission operator entity (and/or local/regional sub-facilities of the power generation and/or transmission operator entity) are currently producing (e.g., supply) and the amounts of power that are currently being consumed (e.g., demand) by customers/clients of the power generation and/or transmission operator entity.

The indications received from the power generation and/or transmission operator entity can be in the form of one or more authenticated standardized alphanumeric character sequences (e.g., each of the respective alphanumeric character sequences can have been encrypted, for instance, using multi-party encryption processes (e.g., multi-party blockchains)) or using asymmetric cryptography (e.g., public-key encryption). Moreover, the standardized character sequences can take the form of multi-dimensional barcode matrices (e.g., quick response (QR) codes). As noted previously, in some instances, the standardized alphanumeric character string can be a string of openly readable text, such as: "There is an elevated risk that there may not be enough electricity to meet the demand on the system," or "When there is a high risk of failure to meet the demand for electricity on the system or breaking operational security limits." These plaintext standardized alphanumeric character strings can, at act 404, be lexically parsed and/or semantically interpreted to determine the meanings associated with the received plaintext standardized alphanumeric character strings. At act 404, similar processes can be performed to decode the symbologies representative of multi-dimensional barcodes and/or barcode matrices.

Concerning predictive risk to the grid data, this data can take to form of telemetric data representative of disparate regions within which the electric power transmission operator generates and transmits electric power. In instances where the electric power transmission operator is unable to supply predictive risk to grid data (e.g., the electric power transmission operator is offline, or communication via communications networks are unavailable), at act 404, this functionality of providing predictive risk to grid data can be performed in real-time by balancing engine 102 and/or scheduling engine 202 based on telemetric data received from disparate telemetric sensors situated in various proximities to locations associated with system 100. Further, in order to generate predictive risk to the grid data, balancing engine 102 and/or scheduling engine 202 can use historical telemetric data that can have been persisted to one or more database farms.

In relation to energy mix type data, this data can represent information regarding the mix of energy sources (fossil fuels/fossil based fuels, solar power, wind power, wave power, hydro electric, electric power storage units, . . . ) that are being used, and/or that have been used, to generate and supply electric power.

Other input data that can be received at act 402 can also include customer modifiers. Customer modifiers can include customer defined aggression levels and customer specified runbooks and runbook levels associated with the runbooks;

energy provider data inclusive of unit rates for the supply of generate power; the ability of the customer/client to be able to supply and augment their own power requirements and supply and transmit any surplus electrical power over the electric power grid (e.g., used during catastrophic emergencies, such as natural disasters, manmade disasters, and the like); whether the customer/client has uninterrupted power supply equipment to supplement their electrical power needs; whether or not the customer/client requires live replication/automatic transfer of critical business processes that in execution to switch over to one or more disaster recovery site, as well as the specific details associated with the identified critical business processes, and the one or more disaster recovery site; and the criticality of the services to be rendered to the customer/client.

At act 406, a determination can be made in regard to whether or not an initiating or triggering event has occurred. In some embodiments, the initiating or triggering event can have been included in the immediate risk to grid data (e.g., in a standardized 'Alert' message, or a standardized 'Warning' message received from electric power generation and/or transmission grid operator). In additional and/or alternative embodiments, the initiating and/or triggering event can be based on predictive risk to grid data (e.g., predications based on received real-time telemetric data and previously persisted historical telemetric data applied, for example, cost-benefit analyses, wherein a benefit associated with adopting a particular course of action is balanced with a cost associated with adopting the particular course of action; and/or multi-objective optimization based on the received real-time telemetric data and the previously persisted historical telemetric data, wherein a selection of a best course of action with regard to group of criteria, from a collection of available alternatives can also be used with equal facility and/or functionality).

In response to determining that an initiating or triggering event has occurred, at act 408, a determination can be made as to whether or not a risk threshold value has been exceeded (alternatively in cases that use lower boundary threshold values, where a risk threshold value has not been surpassed, or where the risk threshold value has fallen below, a floor threshold risk value). Also, at act 408, once it has been determined that the risk threshold value has been exceeded (or as the case maybe the risk threshold value has not been surpassed, or has fallen below a floor threshold risk value) execution of customer specified processes (e.g., outlined in groups of customer defined runbooks) can be facilitated and performed. At act 408 therefore, the following actions can be performed: identify all solutions on the electric power grid for alternative power generating sources (e.g., power generating solutions—nuclear, wind, solar, geothermal, hydro-electric, uninterrupted power supplies, and the like). Further at act 408, based on customer/client defined opt in and/or customer/client defined opt out (e.g., input as one of more customer/client associated certificates comprising customer modifiers that provide indication as to how a specific client/customer wishes to proceed in regard to identified situations in terms of sourcing their electrical power requirements. Additionally, at act 408, the customer modifiers can be applied to each of the customer/client defined runbooks and the machine-readable instructions included in the runbooks can be executed, wherein the execution of the machine-readable instructions, at act 410, can cause equipment of a group of customer/client information technology equipment to be placed in various states of hibernation or shutdown in order to conserve electrical power during times of electrical power grid insufficiencies and/or regional or global power transmission grid failure.

At act 412 the rule based models and/or the neural network based models representative of client/customer rulebooks and/or the executable processing code included in the runbooks can be adapted by adjusting the weighting associated with various rules and/or various arcs that connect to the various event nodes. For instance, rules included in the rule based models can be associated with lesser or greater values depending on whether or not a rule or a grouping of rules were utilized in a prior iteration of the rule based model. Similarly, weights associated with an arc or a collection of arcs that connect event nodes can adjusted in response to whether or not the arc or the collection of arcs were used in a prior iteration of the neural network.

At act 414 predictive risk to grid data and/or energy mix type data can be forwarded to scheduling engine 202. In this regard it should be noted that each of the predictive risk to grid data and/or the energy mix type data can be directly received by the scheduling engine 202, from the power transmission grid operator. Further in this regard, the predictive risk to grid data and/or the energy mix type data can be received via balancing engine 102.

At act 416, in response to receiving the predictive risk to grid data, a determination can be made concerning trends associated with risks to the viability of the sustained or continued supply of power to a region of a grouping of regions by a power generation and transmission operator entity.

At act 418 the determined trends and associated risks to the viability of the sustained and/or continuous supply of power to a region or the grouping of regions can be further used to determine performance trends, optimal (definable maximum or definable minimum) time interval values during which scheduler engine 202 should facilitate and/or effectuate execution of customer/client defined processor intensive processes.

At act 420, based at least in part on the received predictive risk data and/or the received energy mix type data, one or more correlation can be performed in regard to the execution of system processes and the execution of customer/client defined processes. At act 422, the determined data relating to performance trends, optimal time interval values, and the one or more correlations can be persisted to database equipment comprising a collection of database equipment (e.g., a cloud based, cloud situated, database farm). Generally, also included in this persisted data can be time values at which customer/client specified processes, as well as underlying system (e.g., system 100) processes that were initiated, or will be initiated, based at least in part on the predictive risk data and/or the energy mix type data. Additional persisted data can include energy source data (e.g., the energy mix that was, or is being used, to generate the currently supplied electrical power), and average execution duration values associated with the execution of system processes as well as average execution duration value associated the execution of client/customer specified processes.

The data that has been persisted to the collection of database equipment can be used, at act 424, to iteratively and/or recursively improve predictions concerning electric power transmission grid insufficiencies (e.g., brown outs) and/or electric power transmission grid failures (e.g., black outs) on a regional or national scale. These iterative and/or recursive improvements can be based on customer/client defined parameters and can be used, at act 426, to provide recommendations concerning superior time periods within which to execute customer/client processes, provide trend analysis data that can be utilized to adapt/modify weighting values associated with the rule-based models of the customer/client's runbooks, and/or adjust/update weighting values associated with the neural networks representations of the customer/client's runbooks.

At act 428, output from balancing engine 102 and/or output from scheduling engine 202 can be supplied to relief engine 302. Thus, at act 428 relief engine 302 can receive data from both balancing engine 102 and scheduling engine 202. At act 430, relief engine 302, based on the received data from balancing engine 102 and/or data received from scheduling engine 202 can determine whether a catastrophe value has been set to true. In response to identifying that the catastrophe value has been set to true, and based, for example, on predictive risk to grid data (e.g., generated by scheduling engine 202 and/or generated by equipment associated with the electrical power generation and transmission operator entity) relief engine 302, at act 432, can initiate processes to place non-critical customer/client defined processes into various states of hibernation, leaving only customer/client specified critical processes in execution. In relation to placing non-critical customer/client defined process into states of hibernation, this can entail relief engine 302 shutting down (powering off) equipment remotely located and associated with a customer/client information technology infrastructure.

At act 434 determinations can be made regarding the reasons and sources of the catastrophic event, this can involve relief engine 302, at act 436, monitoring, at determined time interval values, the electric power generation and/or transmission operator's grid to identify rationales for a power grid insufficiency, if possible, to identify alternate energy mix combinations that are both available and satisfies the client/customer's defined expectations, and to obtain indications as to whether or not the cause of the catastrophe has been resolved.

At act 438, based on the monitoring and an indication that the catastrophe has been resolved, relief engine 302, at act 440, re-establish execution of the processes that were placed in various states of hibernation, and where necessary re-establish power to any equipment that was previously powered off. At acts 442, 444, and 446, any data and/or instructions that can be been generated by each of balancing engine 102, scheduling engine 202, and/or relief engine 302 can be respectively fed back (e.g., at acts 442 and 444) and output as act 446 (e.g., supplied to equipment affiliated with the electric power generation and/or transmission operator entity, and/or conveyed to equipment associated with customer/client information technology infrastructure.

FIG. 5 illustrates a flowchart or method 500 to facilitate sustainable enterprise wide energy balancing in accordance with various example embodiments. Flowchart or method 500 can commence at act 502, wherein balancing engine 102, for instance, can receive a group of input data from an electric power generation and transmission operator. In response to receiving the group of input data, balancing engine 102 can lexically parse and semantically parse a standardized phrase that can have been included in the group of input data. At act 504, based at least in part on the standard phrase, balancing engine 102 can determine an occurrence of a triggering event. At act 506, balancing engine 102 in response to the triggering event can determine that a risk threshold value has been exceeded and process a flow of processes representing a customized collection of runbooks. At act 508 balancing engine 102, based on the flow of processes being in execution using one or more processors can cause equipment associated with a customer to modify its normal operating trajectory (e.g., place customer/client identified non-critical processes into stasis, boost the executing priorities associated with customer/client defined critical processes to higher priorities, and/or place equipment into power off states).

FIG. 6 illustrates a flowchart or method 600 to facilitate sustainable enterprise wide energy balancing in accordance with various example embodiments. Method 600 can commence at act 602, wherein scheduling engine 202, for instance, in response to receiving predictive risk to grid data can determine a trend associated with a viability of a region that is being supplied with electric power using an electric power generation and transmission grid operator entity. At act 604 scheduling engine 202 can determine performance trends and optimal (maximum and/or minimum) time intervals during which customer/client identified intensive processes and/or tasks should and can be placed in execution. At acts 606 and 608 scheduling engine 202 can based on the predictive risk to grid data, can perform correlations between customer identified processes, performance trends and optimal time intervals, and thereafter store the correlative data related to correlations between the customer identified processes and the performance trends and optimal time intervals to a database of databases. At act 610 scheduling engine 202 can use the correlative data and customer defined parameters to recommend better time windows in which to execute client defined processes, determine trend analysis data for the client defined processes, and adjust/modify weightings associated with customer specified processes included in customer defined rulebooks.

FIG. 7 illustrates a flowchart or method 700 to facilitate sustainable enterprise wide energy balancing in accordance with various example embodiments. Method 700 can commence at act 702, wherein relief engine 302 in response to receiving input from balancing engine 102 and/or scheduling engine 202 and based on determining that a catastrophe flag value has been set to an 'ON' value, can place customer/client defined non-critical processes that are in execution into stasis or hibernation. In some embodiments, relief engine 302 can lower one or more priority values associated with the customer/client defined non-critical processes effectively starving these non-critical processes of computing resources (e.g., throttling back of the amount of processing and memory resources allocated the non-critical processes). At act 704 relief engine 302 can determine a reason as to why the catastrophe flag value was changed from an 'OFF' value to an 'ON' value. At act 706 relief engine 302 can monitor at defined intervals of time to determine whether or not the power transmission grid is providing sufficient electrical power so that the catastrophe flag value can be changed from 'ON' to 'OFF.' At act 708, in response to the catastrophe flag value being changed from 'ON' to 'OFF,' relief engine 302 can commence reestablish execution of the non-critical processes that can have been placed in states of hibernation. In regard to reestablishing execution of the non-critical processes placed in states of hibernation, the order in which the non-critical processes are reestablished can be based on customer/client defined criteria.

Figure 9:
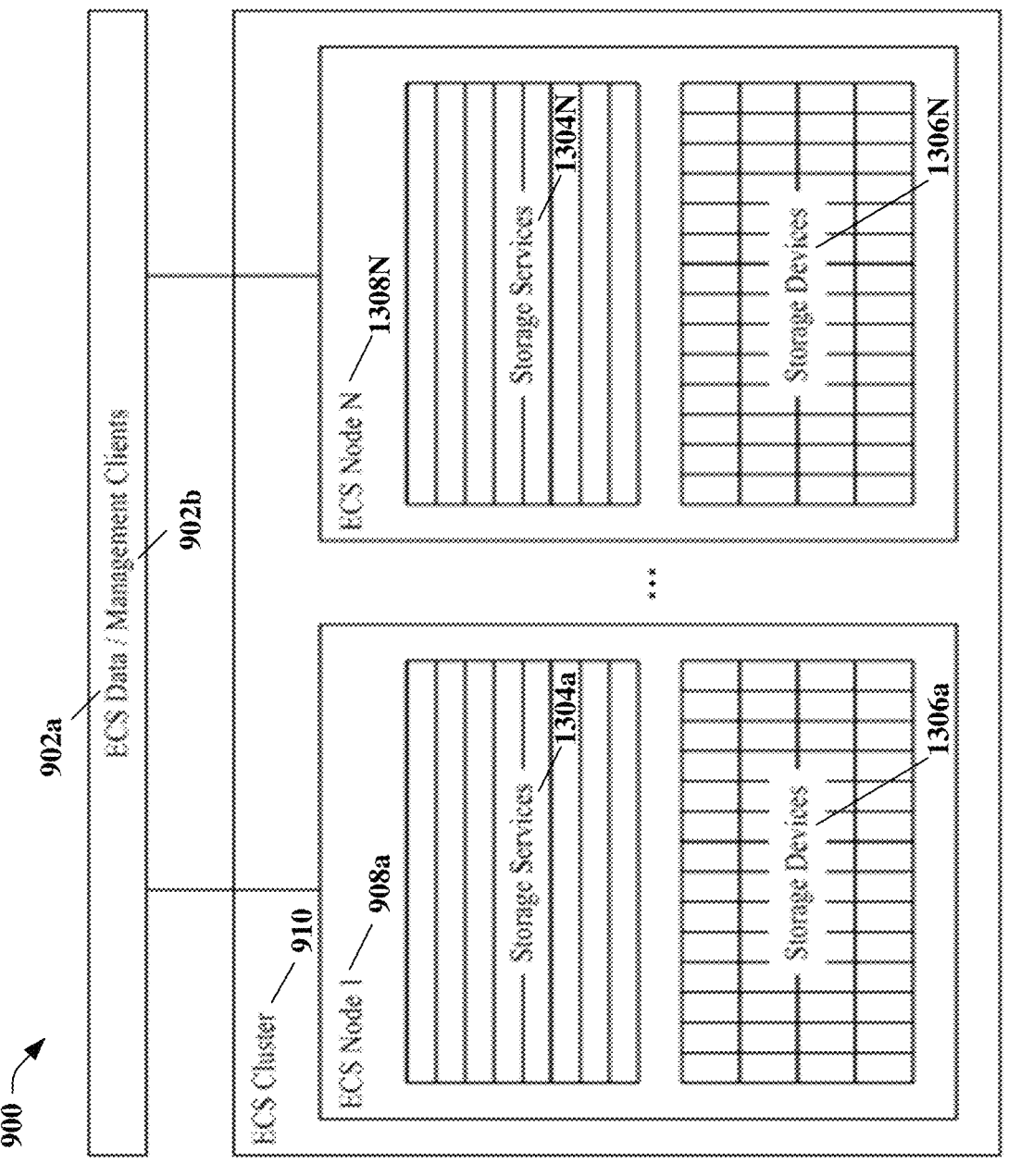
FIG. 9 illustrates an elastic cloud storage (ECS) system, in accordance with various non-limiting example embodiments.

In the following, FIG. 9 describes an example non-limiting cloud storage system in the non-limiting context of an ECS storage system, but for the avoidance of doubt, the subject embodiments can apply to any storage platform. For instance, in this regard, FIG. 9 illustrates an ECS storage system 900 comprising a cloud-based object storage appliance in which corresponding storage control software comprising, e.g., ECS data client(s) 902a, ECS management client(s) 902b, storage service(s) 904a . . . 904N, etc. and storage devices 906a . . . 906N (e.g., storage media, such as physical magnetic disk media, etc. of respective ECS nodes of ECS cluster 910) are combined as an integrated system with no access to the storage media other than through the ECS storage system 900.

In this regard, ECS cluster 910 comprises multiple nodes 908a . . . 908N, storage nodes, ECS nodes, etc. Each node is associated with storage devices 906a . . . 906N, e.g., hard drives, physical disk drives, storage media, etc. In embodiment(s), ECS node 908a, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 900 can be an append-only virtual storage platform that protects content from being erased or overwritten for a specified retention period. In particular, the ECS storage system 900 does not employ traditional data protection schemes like mirroring or parity protection. Instead, the ECS storage system 900 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 900 can support storage, manipulation, and/or analysis of unstructured data on a massive scale on commodity hardware. As an example, the ECS storage system 900 can support mobile, cloud, big data, and/or social networking applications. In another example, the ECS storage system 900 can be deployed as a turnkey storage appliance, or as a software product that can be installed on a set of qualified commodity servers and disks, e.g., within a node, data storage node, etc. of a cluster, data storage cluster, etc. In this regard, the ECS storage system 900 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, $x=(x1, x2, x3, x4, \ldots, xn)$, to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by variance engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1022, disk storage 1024, and/or memory storage 1046, further description of which is below. For instance, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM). Additionally, the disclosed memory components of systems or methods herein are intended to comprise, without being limited to comprising, these and any other suitable types of memory.

Figure 10:
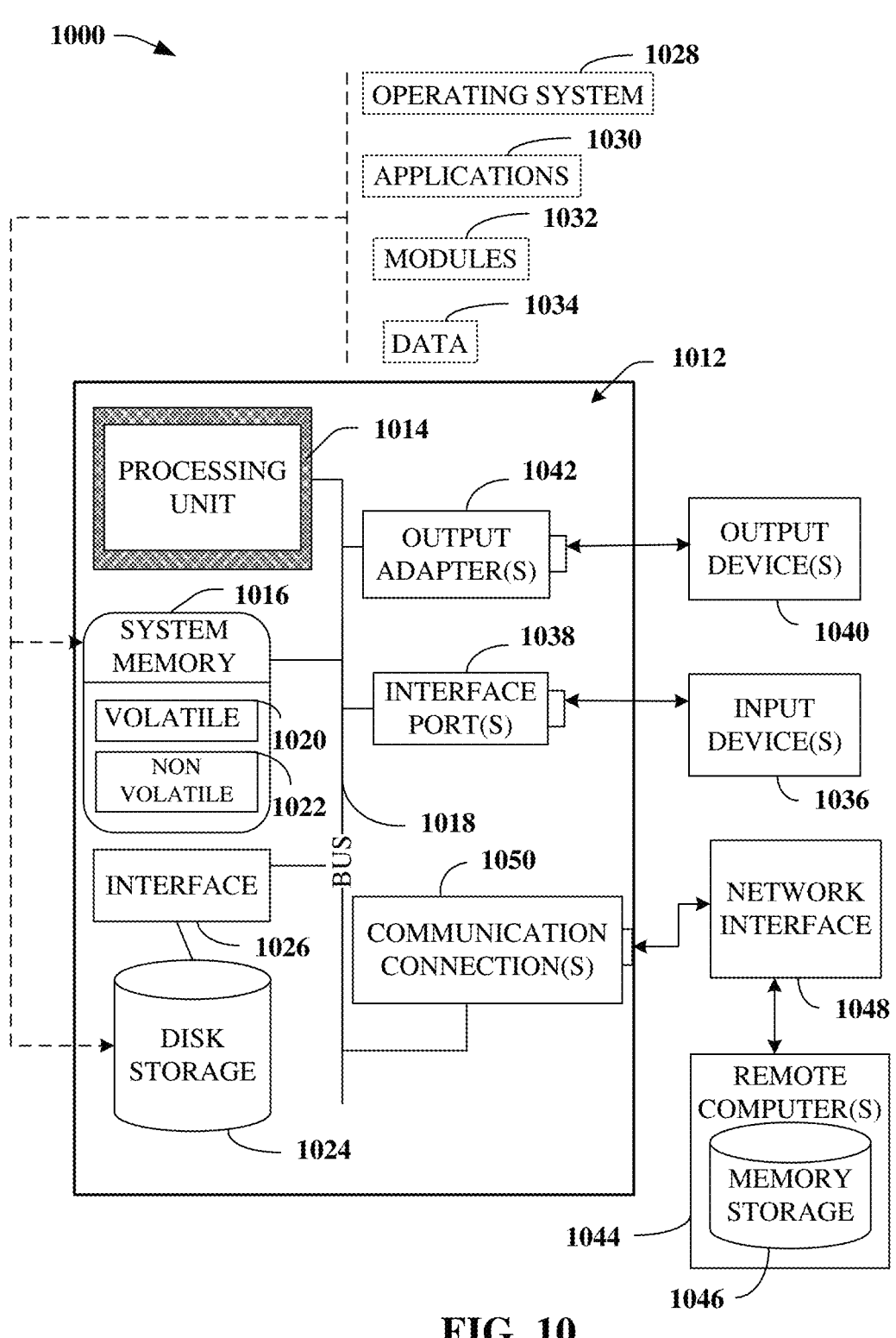
FIG. 10 illustrates a block diagram representing an illustrative non-limiting computing system or operating environment in which one or more aspects of various non-limiting embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., system 100, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. A system, comprising:
one or more processors; and
one or more memories that stores executable instructions that, when executed by the one or more processors, facilitate performance of operations, comprising:
in response to receiving, from first equipment associated with an electric power generation and transmission operator identity, a group of input data representing a standardized phrase, lexically and semantically parsing the standardized phrase to identify an initiating event; and
based at least on the initiating event, determining that an initiating threshold value associated with the initiating event has exceeded a defined risk threshold value, and initiating execution of a flow of processes representing a customer specified collection of runbooks, wherein the execution of the flow of processes is performed by second equipment associated with a customer identity, wherein the initiating event is supplied in sharable certificate data representing user identity opt-in/opt-out data indicative that a user identity has opted-in or opted-out of using the flow of processes, wherein the sharable certificate data is sharable amongst a group of downstream client user identities representing one or more clients of the user identity, and wherein the execution of the flow of processes, based on the sharable certificate data and an aggression value indicative that at least a user identity equipment is executing time sensitive machine code, adjusts, via use of the first equipment, a renewable energy source mix to include alternative sources of consumable energy representing at least electrical power generated by a gas based energy source, a nuclear based energy source, and a coal based energy source.

2. The system of claim 1, wherein one of the group of input data represents predictive risk to grid data, and wherein the operations further comprise:
in response to receiving the predictive risk to grid data, determining trend data associated with a sustained viability associated with maintaining a supply of continuous electrical power to a region of an electric power generation and transmission grid associated with the electric power generation and transmission operator identity.

3. The system of claim 2, wherein the operations further comprise:
based on the trend data associated with the sustained viability of maintaining the supply of continuous electrical power to the region, determining a time window within which to execute the flow of processes on the second equipment.

4. The system of claim 3, wherein the operations further comprise:
based on the trend data and the predictive risk to grid data, perform correlations that correlate the trend data to comprise correlation data, correlate the predictive risk to grid data, and correlate the time window within which to execute the flow of processes on the second equipment.

5. The system of claim 4, wherein the operations further comprise:
based on correlation data, customer modifier data associated with the flow of processors executing on the second equipment, generating recommendation data representative of augmented time windows with which to execute in the flow of processes on the second equipment.

6. The system of claim 1, wherein each runbook of the customer specified collection of runbooks comprises at least a process that is ordered based on the aggression value, and wherein the aggression value is represented based on an aggregation of values representative of a first value, a second value, and a third value of a color spectrum.

7. The system of claim 6, wherein the first value represents a color value associated with the color spectrum, the second value represents a hue value associated with the color value, and the third value represents a brightness value associated with the color value.

8. The system of claim 6, wherein the aggression value is used to display, to a display device, a color representation of the process in execution.

9. The system of claim 1, wherein the operations further comprise, in response to determining that the initiating threshold value associated with the initiating event has fallen below the defined risk threshold value, adjusting weighting values associated with each process comprising the customer specified collection of runbooks.

10. A method, comprising:

receiving, by a device comprising at least one processor, a group of input data representing a standardized phrase, wherein the group of input data is received from first equipment associated with an electric power generation and transmission operator entity;

semantically parsing, by the device, the standardized phrase to identify an initiating event;

in response to identifying the initiating event, determining, by the device, that an initiating threshold value associated with the initiating event has fallen below a defined risk threshold value; and facilitating, by the device, executing, via remote second equipment, a flow of customer defined processes representing a group of runbooks, wherein the initiating event is included in sharable certificate data representing user identity opt-in/opt-out data indicative that a user identity has opted-in or opted-out of using the flow of customer defined processes, wherein the sharable certificate data is sharable amongst a group of downstream client user identities representing one or more subordinate user identities of the user identity, and wherein the executing of the flow of customer defined processes, based on the sharable certificate data and an aggression value indicative that at least user identity equipment is executing time sensitive machine code, adapts, via use of the first equipment, a renewable energy source mix to include alternative sources of consumable energy representing at least electrical power generated by a gas based energy source, a nuclear based energy source, and a coal based energy source.

11. The method of claim 10, wherein each runbook of the customer defined processes representing the group of runbooks comprises at least one process that is ranked based on the aggression value, and wherein the aggression value is represented based on a combination of values representing a first value, a second value, and a third value of a color spectrum.

12. The method of claim 11, wherein the first value represents a color value associated with the color spectrum, the second value represents a hue value associated with the color value, and the third value represents a brightness value associated with the color value.

13. The method of claim 11, wherein the aggression value is used to display, to a display device, a color representation of the process in execution.

14. The method of claim 10, wherein the standardized phrase is a representation of a multidimensional matrix barcode.

15. The method of claim 10, further comprising, in response to determining that the initiating threshold value associated with the initiating event is less than the defined risk threshold value, adapting, by the device, weighting values associated with each process comprising the customer specified collection of runbooks.

16. The method of claim 10, wherein one of the group of input data represents predictive risk to grid data, and further comprising in response to receiving the predictive risk to grid data, determining, by the device, trend data associated with a sustained viability associated with maintaining a supply of continuous electrical power to a region of an electric power generation and transmission grid associated with the electric power generation and transmission operator entity.

17. The method of claim 16, further comprising based on the trend data associated with the sustained viability of maintaining the supply of continuous electrical power to the region, determine, by the device, a time window within which to execute the flow of processes on the second equipment; and based on the trend data and the predictive risk to grid data, perform correlations that correlate the trend data to comprise correlation data, the predictive risk to grid data, and the time window within which to execute the flow of processes on the second equipment.

18. A non-transitory machine-readable medium comprising instructions that, in response to execution, cause a system comprising at least one processor to perform operations, comprising:

receiving a group of input data representing a standardized phrase, wherein the group of input data is received from first equipment associated with an electric power generation and transmission operator entity;

parsing the standardized phrase to identify an initiating event;

in response to identifying the initiating event, determining that an initiating threshold value associated with the initiating event has fallen below a defined risk threshold value; and executing, via remote second equipment, a flow of customer defined processes representing a group of runbooks, wherein the initiating event is included in sharable certificate data representing user identity opt-in/opt-out data indicative that a user identity has opted-in or opted-out of using the flow of customer defined processes, wherein the sharable certificate data is sharable amongst a group of downstream client user identities representing one or more subordinate user identities of the user identity, and wherein the executing of the flow of customer defined processes, based on the sharable certificate data and an aggression value included in the sharable certificate data that indicates that equipment associated with the one or more subordinate user identities is not executing time sensitive machine code, modifies, via use of the first equipment, a renewable energy source mix to exclude alternative sources of generated non-renewable energy representing at least power generated by a gas based energy source, a nuclear based energy source, and a coal based energy source.

19. The non-transitory machine-readable medium of claim 18, wherein each runbook of the customer defined processes representing the group of runbooks comprises at least one process that is ordered based on the aggression value, and wherein the aggression value is represented based on a summation of values representative of a first value, a second value, and a third value of a color spectrum.

20. The non-transitory machine-readable storage medium of claim 19, wherein the first value represents a color value associated with the color spectrum, the second value represents a hue value associated with the color value, and the third value represents a brightness value associated with the color value.

\* \* \* \* \*